US012013693B1

(12) United States Patent
Chan et al.

(10) Patent No.: US 12,013,693 B1
(45) Date of Patent: Jun. 18, 2024

(54) COMPONENT VERIFICATION SYSTEM

(71) Applicant: Zoox, Inc., Foster City, CA (US)

(72) Inventors: Jonathan Philip Wai Wah Chan, Monte Sereno, CA (US); Kai Zhenyu Wang, Foster City, CA (US)

(73) Assignee: Zoox, Inc., Foster City, CA (US)

(*) Notice: Subject to any disclaimer, the term of this patent is extended or adjusted under 35 U.S.C. 154(b) by 830 days.

(21) Appl. No.: 16/730,948

(22) Filed: Dec. 30, 2019

(51) Int. Cl.
*G05D 1/00* (2024.01)
*G06N 20/00* (2019.01)

(52) U.S. Cl.
CPC ......... *G05D 1/0061* (2013.01); *G05D 1/0221* (2013.01); *G05D 1/0289* (2013.01); *G06N 20/00* (2019.01)

(58) Field of Classification Search
CPC .. G05D 1/0061; G05D 1/0221; G05D 1/0289; G06N 20/00
See application file for complete search history.

(56) References Cited

U.S. PATENT DOCUMENTS 10,830,669 B2 * 11/2020 Sun .................. B60W 50/0205
2017/0080234 A1 * 3/2017 Gillespie ............ A61N 1/37247
2019/0130056 A1 * 5/2019 Tascione .............. G05D 1/0088
2019/0354859 A1 * 11/2019 Xu ......................... G06N 3/006
2019/0367020 A1 * 12/2019 Yan ........................ G06V 20/58
2019/0384994 A1 * 12/2019 Frossard ............. G05D 1/0088

FOREIGN PATENT DOCUMENTS

EP          1705624 A1 * 9/2006 .............. B60T 7/22

OTHER PUBLICATIONS

English translation of EP-1705624-A1.*

* cited by examiner

*Primary Examiner* — Anshul Sood
*Assistant Examiner* — Matthew Ho
(74) *Attorney, Agent, or Firm* — Lee & Hayes, P.C.

(57) ABSTRACT

Techniques are disclosed for component verification for complex systems. The techniques may include receiving log data, obtaining ground truth data based on the log data and determining an outcome at least in part by simulating a prediction by a prediction component based on the log data and the ground truth data. The techniques may further include simulating a second prediction by the prediction component based on the ground truth data, determining whether the second prediction resulted in the negative outcome of the scenario and determining the disengagement event is attributable to a perception component of the autonomous operation system at least partly in response to determining the second prediction based on the ground truth data did not result in the negative outcome.

20 Claims, 6 Drawing Sheets

COMPONENT VERIFICATION SYSTEM

BACKGROUND

A vehicle can use sensors to capture sensor data to detect objects in an environment. Accurate and precise sensor data can assist, for example, an autonomous vehicle, to traverse the environment. In some instances, the captured sensor data and perception processing performed thereon may provide perception data with a degree of uncertainty. Determining a component at the root of a failure by the autonomous operation systems of an autonomous vehicle may be difficult. For example, it may be difficult to determine whether the root of a failure lies with a perception component generating perception data with a degree of uncertainty or a prediction component utilizing the perception data with the degree of uncertainty.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
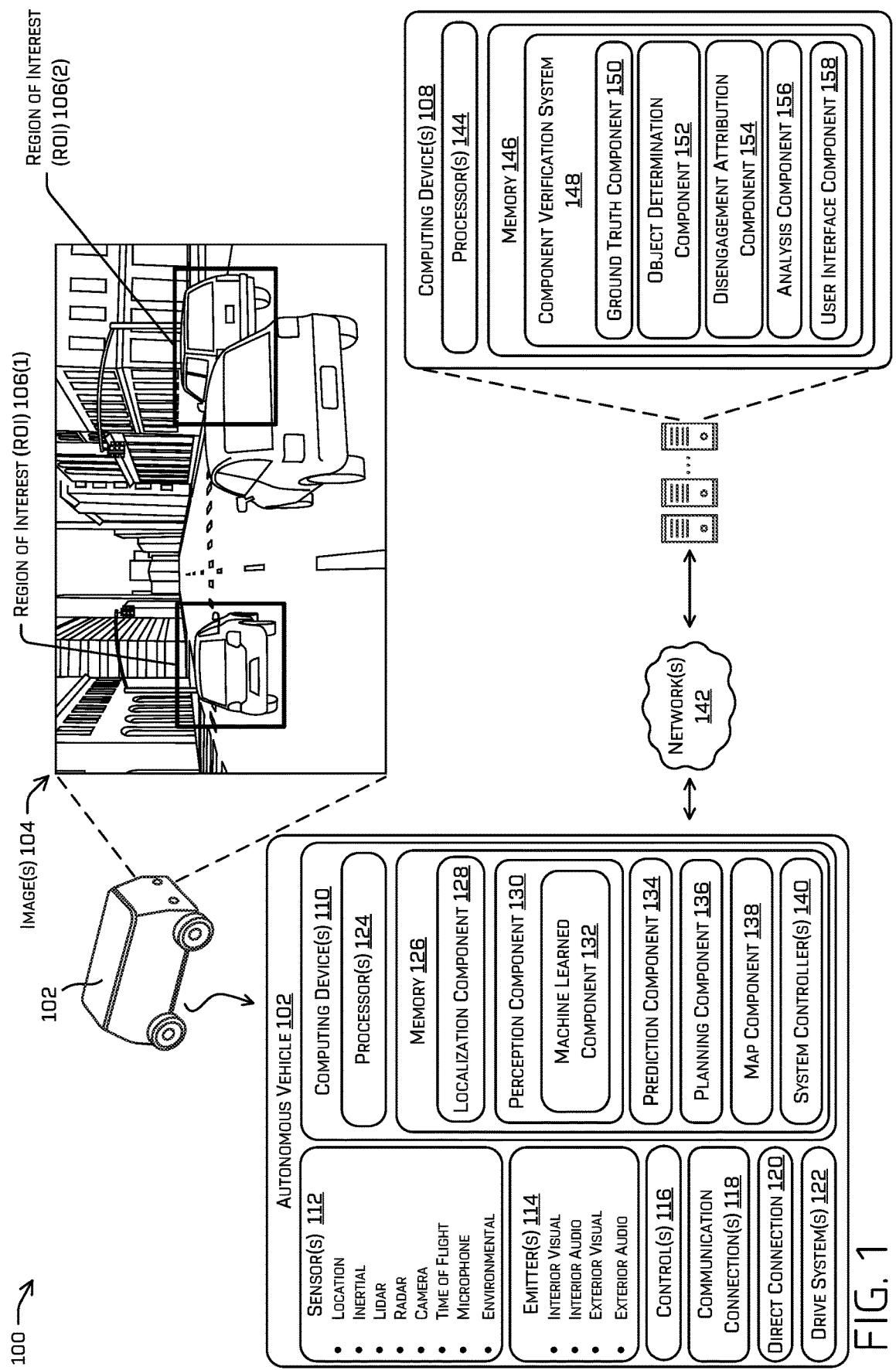
FIG. 1 illustrates an example autonomous vehicle system that may provide a component verification functionality.

This disclosure is directed to systems and techniques that may provide for component verification, for example, regarding a cause of a failure in a complex system, such as an autonomous operation system that provides for navigating an autonomous vehicle within an environment. Such complex systems may comprise, for example, multiple systems, subsystems, and components in which a failure may not be indicative of a fault of any such system, subsystem, or component. Systems and techniques according to this disclosure may be configured to determine which component or subsystem caused and/or contributed to the failure. In some examples, systems and techniques according to this disclosure may be configured to determine whether the root of a failure lies with a perception component generating perception data with a degree of uncertainty or a prediction component utilizing the perception data, though any other component, system, or subsystem is contemplated.

In some examples, the failure of the autonomous operation system may be a disengagement event, performance of a safety maneuver, or other events. A disengagement event may refer to an event in which an operator of the autonomous vehicle disengages the autonomous operation of the autonomous vehicle (e.g. assumes manual control) due to a perceived failure of the autonomous operation system during operation. Based on information displayed to the operator, the operator may determine that the perception or prediction components of the autonomous operation system have not properly processed sensor data. For example, the operator may be provided with a display that may show information indicating objects and other vehicles perceived by the autonomous operation system and indicating predicted behavior or movements thereof. The operator may determine another vehicle has not been perceived or is not acting in accordance with the prediction output and assume manual control to avoid a negative outcome.

In some examples herein, the autonomous operation system may operate to detect trigger events, such as disengagement events. Upon detecting such a trigger event, the autonomous operation system may collect log data regarding the operation of the autonomous operation system at the time of the trigger event (e.g. sensor data, information derived by the autonomous operation system components—detections, segmentations, etc., command applied to the vehicle—accelerations, steering angles, etc., operator inputs, etc.). The log data may then be provided to a component verification system, which may be part of a remote central control system for one or more autonomous vehicles, for analysis. In some examples, the component verification system may determine which component of the autonomous operation system may be improved and how the component should be improved to reduce future occurrence of trigger events. Of course, any portion of the above may be performed locally (i.e., at the vehicle) and/or remotely (i.e., at the remote system). In a non-limiting example, vehicle log data (generated at the vehicle) may be sent to a remote system (over a wired and/or wireless communication) and such remote system may process the log data to determine an indication of a trigger event and determine the associated log data.

The discussion below utilizes disengagement events as examples of trigger events for ease of understanding and discussion. However, this does not imply any limitations on the techniques and systems disclosed herein and many other types of trigger events may be handled in a similar manner. Another example type of trigger events may be hard braking events which may be undesirable in scenarios where such events are avoidable. Further, disengagement events may be sourced from a redundant safety system that may monitor the operations of the autonomous operation system and may disengage the autonomous operation mode or engage other safety protocols, for example, for similar reasons to those discussed above for a human operator (e.g., performing one or more maneuvers including, but not limited to, a safe stop maneuver, limiting aspects of the vehicle (speed, direction of travel, etc.), and the like).

Upon receiving log data from a disengagement event, the component verification system may operate to determine or obtain ground truth data for the event. As mentioned above, information derived from sensor data by the perception component may have a degree of uncertainty which may be the source of the disengagement or the perception component may output incorrect data (e.g. errors or data that is different than ground truth). In some examples, the ground truth data may include information about objects and other vehicles in the environment (e.g. velocity, yaw, distance to the autonomous vehicle, etc.) with less or no uncertainty in comparison to the log data. Further, the ground truth data may include information about the objects and other vehicles in the environment for a period of time before and after the event (e.g. the observed path of vehicles after the disengagement). In at least some examples, such ground truth data may be hand labeled log data indicating positions, trajectories, etc. of objects in sensor data.

The component verification system may then utilize the ground truth data to determine the object or cause of the disengagement event. For example, the component verification system may simulate the scenario associated with the disengagement event using the ground truth data. The component verification system may determine whether, had the operator not disengaged the autonomous operation of the autonomous vehicle, a negative outcome would have occurred with regard to an object in the environment (e.g. an accident, a hard braking event, a swerving event, a time to collision below a threshold value, etc.). An object or cause for which a negative outcome would have occurred may be determined to be the object or cause. Alternatively, the component verification system may determine the closest object to be the object or cause or the component verification system may output a visual representation of the scenario to a reviewing user who may provide feedback identifying the object or cause.

If an object or cause is not determined, the component verification system may log the event as an unnecessary and/or indeterminate. If an object or cause is determined, the component verification system may determine whether a practical actor (e.g. a reasonably skilled and capable human) could have avoided the scenario resulting in the disengagement based on the ground truth data (i.e. whether the event or scenario was an avoidable event or scenario). If the scenario was determined to be unavoidable, the component verification system may log the disengagement as an unavoidable scenario and discontinue processing the disengagement event. Otherwise, the component verification system may proceed to determine the component of the autonomous operation system that caused the disengagement event.

In some examples, the component verification system may repeat the prediction processing performed by a prediction component of the autonomous operation system using the ground truth data (e.g. output ground truth-based prediction output data which may be determined from log data). As a non-limiting example, log data may be used to determine an exact trajectory an object took and such a trajectory may be input into the planner system for generating controls for the vehicle. The component verification system may then utilize the ground truth-based prediction output data to simulate further operations of the autonomous operation system (e.g. simulate planning by the planner using the ground truth-based prediction output data). The component verification system may then determine if the autonomous operation system would have correctly handled the scenario associated with the event using the ground truth-based prediction output data. Additionally, or alternatively, differences between perception output associated with an object (location, classification, segmentation, etc.) may be compared with measured data from the log data, differences between a predicted trajectory and actual trajectory may be determined, differences of predicted trajectories using perception output and ground-truth data may be determined, and the like. Any one or more of the differences discussed herein may be used (in isolation or together) to determine the cause of the error.

For example, the component verification system may determine whether the object or cause of the event would have impacted travel of the autonomous vehicle. In addition or alternatively, prediction messages of the log data may be compared to the output of the prediction system using the ground truth input (e.g., per object). Differences in the previously determined prediction data and the ground truth-based prediction output data may be indicative of a difference with the perception system (e.g., had the perception output more correct data, the prediction outputs should not diverge as much). If the autonomous operation system would have correctly handled the scenario associated with the event using the ground truth-based prediction output data or the ground truth-based prediction output data matches the corresponding ground truth values, the component verification system may determine that the perception component of the autonomous operation system may be improved to reduce the occurrence of future events.

The component verification system may also perform an analysis to determine one or more perception component outputs that may be improved to accomplish the reduction in the occurrence of future events. If the autonomous operation system (e.g. a planner component thereof) failed to correctly handle the scenario associated with the event when provided with the ground truth-based prediction output data or the ground truth-based prediction output data deviates more than a threshold amount from the corresponding ground truth values, the component verification system may determine that the planner component of the autonomous operation system may be improved to reduce the occurrence of future events. Implementations are not limited to the above determinations. For example, in addition or alternative to determining if the scenario were handled correctly based on ground truth-based prediction output data to determine whether the perception system may be the cause of the event, the component verification system may determine whether a difference between the ground truth-based prediction output data and the prediction based output of a prediction system using the log data is above a threshold value. If so, the component verification system may determine the prediction component is at least partially a cause of the event because the event would likely occur regardless of improvements to the perception component.

The component verification techniques and systems described herein can improve the functioning of a computing device, such as an autonomous operation system, by providing data reflecting components to which trigger events may be attributed and which may be improved to avoid or reduce the occurrence of trigger events in future operations with reduced difficultly and cost. For example, the component verification techniques can allow identification of the component to which the trigger event may be attributed more accurately while requiring less manual input and/or disruption. For example, in some instances, faster and/or more accurate attribution of the trigger event to a component of the autonomous operation system can be used in improving the identified component and/or aspect of the component more quickly, reducing disruptions and resulting in a shorter window in which similar trigger events may be experienced thereby improving safety for occupants of an autonomous vehicle (e.g. by reducing the window in which the autonomous operation system is subject to performing an inappropriate action (e.g. trigger event) based on inaccurate output of the identified component). Further, by quantifying the error associated with the perception system and the accuracy of perception needed to avoid negative outcomes, the component verification system allows for better direction of resources toward such improvements. These and other improvements to the functioning of the computer are discussed herein.

Example Architecture

FIG. 1 illustrates an example autonomous vehicle system 100 including a component verification system functionality. More particularly, the component verification system may provide functionality that may analyze logged data (which may be associated with an event, such as a disengagement event) in autonomous vehicles to determine an autonomous operation system component to which the event can be attributed and/or aspects of the determined component which may be improved to reduce the occurrence of future events.

In at least one example, the system 100 can include a vehicle 102. In the illustrated example system 100, the vehicle 102 is an autonomous vehicle; however, the vehicle 102 can be any other type of vehicle. In some examples, the vehicle 102, whether in a fully autonomous operation mode or while in a mode with some level of autonomous operation, may be monitored and/or at least partially operated by an operator (not shown). The operator may monitor the operations of the vehicle 102 at least in part based on images 104 displayed to the operator that may indicate the current perception, prediction and planning state of the vehicle 102. The operator may cause disengagement of the autonomous operation of the vehicle 102, for example, based on the displayed images 104, ROIs 106 and the operator's own view of the environment. While examples herein relate to an operator monitoring and disengaging the autonomous operations of the vehicle to cause a disengagement event, implementations are not so limited and other examples may include disengagement or other events initiated by an automated monitoring component or by a remote teleoperator.

In the illustrated example, a portion of the current perception, prediction and planning state of the vehicle 102 is shown in the image(s) 104. Specifically, image(s) 104 include a representation of three other vehicles. The perception component of the vehicle 102 may generate ROIs 106(1) and 106(2), each corresponding to a respective object (such as additional vehicles) represented in images 104. In the illustrated example, the ROIs 106 are represented as bounding boxes, although other techniques for identifying the ROIs are contemplated. The perception component may also determine information about object(s) in the environment, such as velocity, yaw, classification, extent (e.g., length, width, height), lighting state (e.g., blinkers, brake lights, etc.). Of course, in some implementations, additional details beyond bounding boxes may be provided in the image(s) displayed to an operator of the autonomous vehicle (e.g. speed, directional indicator, predicted path, etc.). The level of detail has been minimized herein to avoid prolix and unneeded complexity. Such a perception system may operate in various and/or combined modalities (camera, LIDAR, RADAR, time of flight, sonar, etc.) and include any operation on such raw data which provides information to another component including, but not limited to, detections, classifications, segmentations, etc.

The vehicle 102 may include a controller (e.g. system controller 140) which may operate to detect the disengagement event, collect log data regarding the operation of the autonomous operation system at the time of the disengagement event (e.g. sensor data, information derived by the perception, prediction, and planning components, operator inputs, etc.), and provide the log data to computing devices 108 which may include a component verification system 148.

As will be discussed below in greater detail, the component verification system 148 may analyze disengagement events in the vehicle 102 to determine an autonomous operation system component to which the disengagement can be attributed and aspects of the determined component which may be improved to reduce the occurrence of future disengagement events.

The vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 102 can include one or more computing device(s) 110, one or more sensor system(s) 112, one or more emitter(s) 114, one or more control(s) 116, one or more communication connection(s) 118 (also referred to as communication devices and/or modems), at least one direct connection 120 (e.g., for physically coupling with the vehicle 102 to exchange data and/or to provide power), and one or more drive system(s) 122.

The one or more sensor system(s) 112 can be configured to capture sensor data associated with an environment. The one or more sensor system(s) 112 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 112 can include multiple instances of each of these or other types of sensors. For instance, the time-of-flight sensors can include individual time-of-flight sensors located at the corners, front, back, sides, and/or top of the vehicle 102. As another example, the camera sensors can include multiple cameras disposed at various locations about the exterior and/or interior of the vehicle 102. The one or more sensor system(s) 112 can provide input to the computing device 110.

The vehicle 102 can also include one or more emitter(s) 114 for emitting light and/or sound. The one or more emitter(s) 114 in this example include interior audio and visual emitters to communicate with passengers of the vehicle 102. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. In some examples, the emitter(s) 114 may include a display that displays images 104 to a passenger/operator of the vehicle 102. The one or more emitter(s) 114 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 102 can also include one or more control(s) 116. The control(s) 116 may provide for an input to disengage the autonomous operation of the vehicle 102 and/or input to the vehicle 102. For example, the control(s) 116 may include standard controls for driving the vehicle 102, such as a steering wheel, an acceleration pedal, and/or a brake pedal, which may be utilized to disengage the autonomous operation mode and for manual control of the vehicle following disengagement. As mentioned above, while examples herein relate to an operator monitoring and disengaging the autonomous operations of the vehicle to cause a disengagement event, implementations are not so limited and other examples may include disengagement or other events initiated by an automated monitoring component or by a remote teleoperator. In such examples, the vehicle may perform a safety maneuver (e.g., a stop, limiting controls (e.g., limit speeds, turning rates, etc.), flag a recalibration, a verification of the software, etc.) in the event of a discrepancy or increase in uncertainty according to any of the techniques described herein.

The vehicle 102 can also include one or more communication connection(s) 118 that enable communication between the vehicle 102 and one or more other local or remote computing device(s) (e.g., a remote teleoperation computing device) or remote services. For instance, the one or more communication connection(s) 118 can facilitate communication with other local computing device(s) on the vehicle 102 and/or the one or more drive system(s) 122. Also, the one or more communication connection(s) 118 can allow the vehicle 102 to communicate with other nearby computing device(s) (e.g., other nearby vehicles, traffic signals, etc.).

The one or more communications connection(s) 118 can include physical and/or logical interfaces for connecting the computing device 110 to another computing device or one or more external networks 142 (e.g., the Internet). For example, the one or more communications connection(s) 118 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 102 can include one or more drive system(s) 122. In some examples, the vehicle 102 can have a single drive system 122. In at least one example, if the vehicle 102 has multiple drive systems 122, individual drive systems 122 can be positioned on opposite ends of the vehicle 102 (e.g., the front and the rear, etc.). In at least one example, the drive system(s) 122 can include one or more sensor system(s) 112 to detect conditions of the drive system(s) 122 and/or the surroundings of the vehicle 102. By way of example and not limitation, the sensor system(s) 112 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 122. In some cases, the sensor system(s) 112 on the drive system(s) 122 can overlap or supplement corresponding systems of the vehicle 102 (e.g., sensor system(s) 112).

The drive system(s) 122 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 122 can include a drive system controller which can receive and preprocess data from the sensor system(s) 112 and to control operation of the various vehicle systems. In some examples, the drive system controller can include one or more processor(s) and memory communicatively coupled with the one or more processor(s). The memory can store one or more components to perform various functionalities of the drive system(s) 122. Furthermore, the drive system(s) 122 also include one or more communication connection(s) that enable communication by the respective drive system with one or more other local or remote computing device(s).

The computing device 110 can include one or more processor(s) 124 and memory 126 communicatively coupled with the one or more processor(s) 124. In the illustrated example, the memory 126 of the computing device 110 stores a localization component 128, a perception component 130 comprising a machine learned component 132, a prediction component 134, a planning component 136, a maps component 138, and one or more system controller(s) 140. Though depicted as residing in the memory 126 for illustrative purposes, it is contemplated that the localization component 128, the perception component 130, the machine learned component 132, the prediction component 134, the planning component 136, the maps component 138, and the one or more system controller(s) 140 can additionally, or alternatively, be accessible to the computing device 110 (e.g., stored in a different component of vehicle 102) and/or be accessible to the vehicle 102 (e.g., stored remotely).

In memory 126 of the computing device 110, the localization component 128 can include functionality to receive data from the sensor system(s) 112 to determine a position of the vehicle 102. For example, the localization component 128 can include and/or request/receive a three-dimensional map of an environment and can continuously determine a location of the autonomous vehicle within the map. In some instances, the localization component 128 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 128 can provide data to various components of the vehicle 102 to determine an initial position of an autonomous vehicle for generating a trajectory.

The localization component 128 can use depth data generated by the machine learned model component 132 to perform operations to determine the position of the vehicle 102. The depth data can provide a local map for comparing against a three-dimensional map (e.g., mesh). In some instances, the localization component 128 can provide functionality to determine an error associated with the local map, the three-dimensional map, and/or the one or more sensor system(s) 112. For example, the localization component 128 can determine a position error (e.g., drift error) associated with the vehicle 102. Over time in operation, errors may accumulate, resulting in errors in positioning and/or trajectory data. In some instances, the localization component 128 can determine the error based on, for example, the position error meeting or exceeding a threshold value. In some instances, the localization component 128 can, based on the position error, determine a calibration adjustment associated with the one or more sensor system(s) 112.

In some instances, the localization component 128 can determine an update associated with the three-dimensional map. For purposes of illustration only, the one or more sensor system(s) 112 can provide location data to the localization component 128. Additionally, the localization component 128 can determine a location based on a comparison of the local map and the three-dimensional map. However, the comparison can indicate that one or more points of the local map do not correspond with the three-dimensional map. This can indicate that the three-dimensional map is out of date. The localization component 128 can determine a difference between the local map and the three-dimensional map as a map updated and store the map update or provide the map update to, for example, a map data server via network 142.

The perception component 130 can include functionality to perform object detection, segmentation, and/or classification. In some examples, the perception component 130 can provide processed sensor data that indicates a presence of an entity that is proximate to the vehicle 102 and/or a classification of the entity as an entity type (e.g., car, pedestrian, cyclist, building, tree, road surface, curb, sidewalk, unknown, etc.). In additional and/or alternative examples, the perception component 130 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 130 can use perception algorithms to determine a perception-based bounding box associated with an object in the environment based on sensor data. For example, the perception component 130 can receive image data and classify the image data to determine that an object is represented in the image data. Then, using detection algorithms, the perception component 130 can generate a two-dimensional bounding box and/or a perception-based three-dimensional bounding box associated with the object. The perception component 130 can further generate a three-dimensional bounding box associated with the object. In some examples, the three-dimensional bounding box can provide additional information such as a location, orientation, pose, and/or size (e.g., length, width, height, etc.) associated with the object.

The perception component 130 can include functionality to store perception data generated by the perception component 130. In some instances, the perception component 130 can determine a track corresponding to an object that has been classified as an object type. For purposes of illustration only, the perception component 130, using sensor system(s) 112 can capture one or more images of an environment. The sensor system(s) 112 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 112, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In such an example, the computing device may determine a track corresponding to a pedestrian.

The perception component 130 can include a machine learned component 132, which can be trained to determine depth data based on image data. In some examples, the machine learned component 132 can include functionality to receive image data (e.g., a single image frame) and can output depth data associated with each pixel in the image data. In some cases, the machine learned component 132 can function as a backup component in the event one or more other sensors are components are not functioning, and in some examples, the machine learned component 132 can function as a primary source of depth data for the localization component 128, the perception component 130, the prediction component 134, and/or the planning component 136. The above machine learning component 132 of the perception component is merely an example and any number of other determinations of the perception component may be performed including, but not limited to, detections (whether an object of a particular classification is located in the data and, if so, a bounding region), semantic segmentations, instance segmentations, classifications, and the like.

Additional discussion of perception operations of the perception component 130 and the machine learned components thereof is provided in U.S. patent application Ser. Nos. 16/201,842, 16/234,862, 16/238,475 and 16/386,249, the entirety of which are incorporated herein by reference.

The prediction component 134 can generate one or more predicted paths of objects in the environment and/or actions that the object may take (cross a street, turn, etc.) based on the sensor data and output from the perception component (bounding boxes, classes, size, position, etc.). In at least some examples, the prediction component 134 can generate probability maps representing prediction probabilities of possible locations of one or more objects in an environment at one or more times in the future. In some instances, the prediction component 134 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 136 can determine a path for the vehicle 102 to follow to traverse through an environment based on one or more of the prediction and/or perception output. For example, the planning component 136 can determine various routes and paths and various levels of detail. In some instances, the planning component 136 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 136 can generate an instruction for guiding the autonomous vehicle along at least a portion of the route from the first location to the second location. In at least one example, the planning component 136 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 136 can alternatively, or additionally, use data from the perception component 130 and/or the prediction component 134 to determine a path for the vehicle 102 to follow to traverse through an environment. For example, the planning component 136 can receive data from the perception component 130 and/or the prediction component 134 regarding objects associated with an environment. Using this data, the planning component 136 can determine a route to travel from a first location (e.g., a current location) to a second location (e.g., a target location) to avoid objects in an environment. In at least some examples, such a planning component 136 may determine there is no such collision free path and, in turn, provide a path which brings vehicle 102 to a safe stop avoiding all collisions and/or otherwise mitigating damage.

The memory 126 can further include one or more maps 138 that can be used by the vehicle 102 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 138 can include at least one map (e.g., images and/or a mesh). In some examples, the vehicle 102 can be controlled based at least in part on the map(s) 138. That is, the map(s) 138 can be used in connection with the localization component 128, the perception component 130, the machine learned component 132, the prediction component 134, and/or the planning component 136 to determine a location of the vehicle 102, identify objects in an environment, generate prediction probabilit(ies) associated with objects and/or the vehicle 102, and/or generate routes and/or trajectories to navigate within an environment.

In some examples, the one or more maps 138 can be stored on a remote computing device(s) (such as the computing device(s) 108) accessible via network(s) 142. In some examples, multiple maps 138 can be stored based on, for example, a characteristic (e.g., type of entity, time of day, day of week, season of the year, etc.). Storing multiple maps 138 can have similar memory requirements but can increase the speed at which data in a map can be accessed.

In at least one example, the computing device 110 can include one or more system controller(s) 140, which can be configured to control steering, propulsion, braking, safety, emitters, communication, and other systems of the vehicle 102. These system controller(s) 140 can communicate with and/or control corresponding systems of the drive system(s) 122 and/or other components of the vehicle 102, which may be configured to operate in accordance with a path provided from the planning component 136. In some examples, the system controller(s) 140 may be configured to monitor for trigger events such as the disengagement of the operation of the autonomous operation mode and to collect log data associated with detected trigger events. The collected log data may then be provided to the component verification system 148 of the computing devices 108. Of course, in other examples, no such trigger event may be required/used. In such examples, any portion of log data may be used to determine inconsistencies and/or errors in one or more of the subsystems. In at least one such example, message data (including sensor data and output of the one or more subsystems) may continuously be monitored using any of the techniques herein in order to determine a level of safety of the vehicle.

The vehicle 102 can connect to computing device(s) 108 via network(s) 142. Computing device(s) 108 can include one or more processor(s) 144 and memory 146 communicatively coupled with the one or more processor(s) 144. In at least one instance, the one or more processor(s) 144 can be similar to the processor(s) 124 and the memory 146 can be similar to the memory 126. In the illustrated example, the memory 146 of the computing device(s) 108 stores a component verification system 148 comprising a ground truth component 150, an object determination component 152, a disengagement attribution component 154, an analysis component 156, and a user interface component 158. Though depicted as residing in the memory 146 for illustrative purposes, it is contemplated that the ground truth component 150, the object determination component 152, the disengagement attribution component 154, the analysis component 156, and the user interface component 158 can additionally, or alternatively, be accessible to the computing device(s) 108 (e.g., stored in a different component of computing device(s) 108 and/or be accessible to the computing device(s) 108 (e.g., stored remotely).

The processor(s) 124 of the computing device 110 and the processor(s) 144 of the computing device(s) 108 can be any suitable processor capable of executing instructions to process data and perform operations as described herein. By way of example and not limitation, the processor(s) 124 and 144 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 126 computing device 110 and the memory 146 of the computing device(s) 108 are examples of non-transitory computer-readable media. The memory 126 and 146 can store an operating system and one or more software applications, instructions, programs, and/or data to implement the methods described herein and the functions attributed to the various systems. In various implementations, the memory 126 and 146 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 126 and 146 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like. As discussed herein, the component verification system 148 may operate to analyze disengagement events in the vehicle 102 to determine an autonomous operation system component to which the disengagement can be attributed and improvements thereto that may reduce the occurrence of future disengagement events.

In operation, the ground truth component 150 may operate to determine ground truth data based on the log data received from the vehicle 102. In some examples, the log data can include sensor data captured by a vehicle. In some instances, the image data can be modified image data and/or synthetic image data. Additionally, the log data can include sensor data such as lidar data, time of flight data, and/or radar data as ground truth data. Ground truth data may include information about objects and other vehicles in the environment (e.g. velocity, yaw, distance to the autonomous vehicle, etc.) with less or no uncertainty in comparison to the log data or the perception data determined by the vehicle 102. Further, the ground truth data may include information about the objects and other vehicles in the environment for a period of time before and after the disengagement event.

The ground truth data may be determined in various ways. In some examples, the ground truth data may be determined in a similar manner to the perception data determined by the perception component 130 but with higher accuracy. In such cases, the ground truth component may rely on the potentially greater processing resources of the computing devices 108 and the relaxed time constraints of offline operations to utilize, for example, higher accuracy but more resource intensive machine learned models to generate the ground truth data. Additionally or alternatively, the ground truth component 150 may be provided by an operator through, for example, the user interface component 158. In such cases, the operator who may supply the ground truth data may be a local user of the component verification system or a remote user of a remote system.

Once the ground truth data is determined or received, the object determination component 152 of the component verification system 148 may operate to determine the object that caused the disengagement. The object may be determined in various ways. In some examples, the object determination component 152 may compare the perception data to the ground truth data and identify differences, as described in detail herein. The example images 104 illustrate a cause of disengagement that may be found for such a comparison. In particular, upon comparing the ground truth data to the perception data illustrated in the images 104, the object determination component 152 may determine the failure to perceive the closest vehicle likely caused the operator to disengage the autonomous operation mode of the vehicle 102 (e.g. the closest vehicle is identified as the object). In addition or alternatively, the object determination component 152 may simulate the operations of the vehicle 102 planned before the disengagement and/or based on the perception data and determine negative outcomes for the simulated operations when the other vehicles or objects move based on the ground truth data. In such a way, the object determination component 152 may determine the object that caused of the disengagement in a scenario where, for example, the operator disengaged the autonomous mode in response to observing that another vehicle swerved toward vehicle 102 without the autonomous operation components of the vehicle 102 perceiving or predicting the change.

Figure 2:
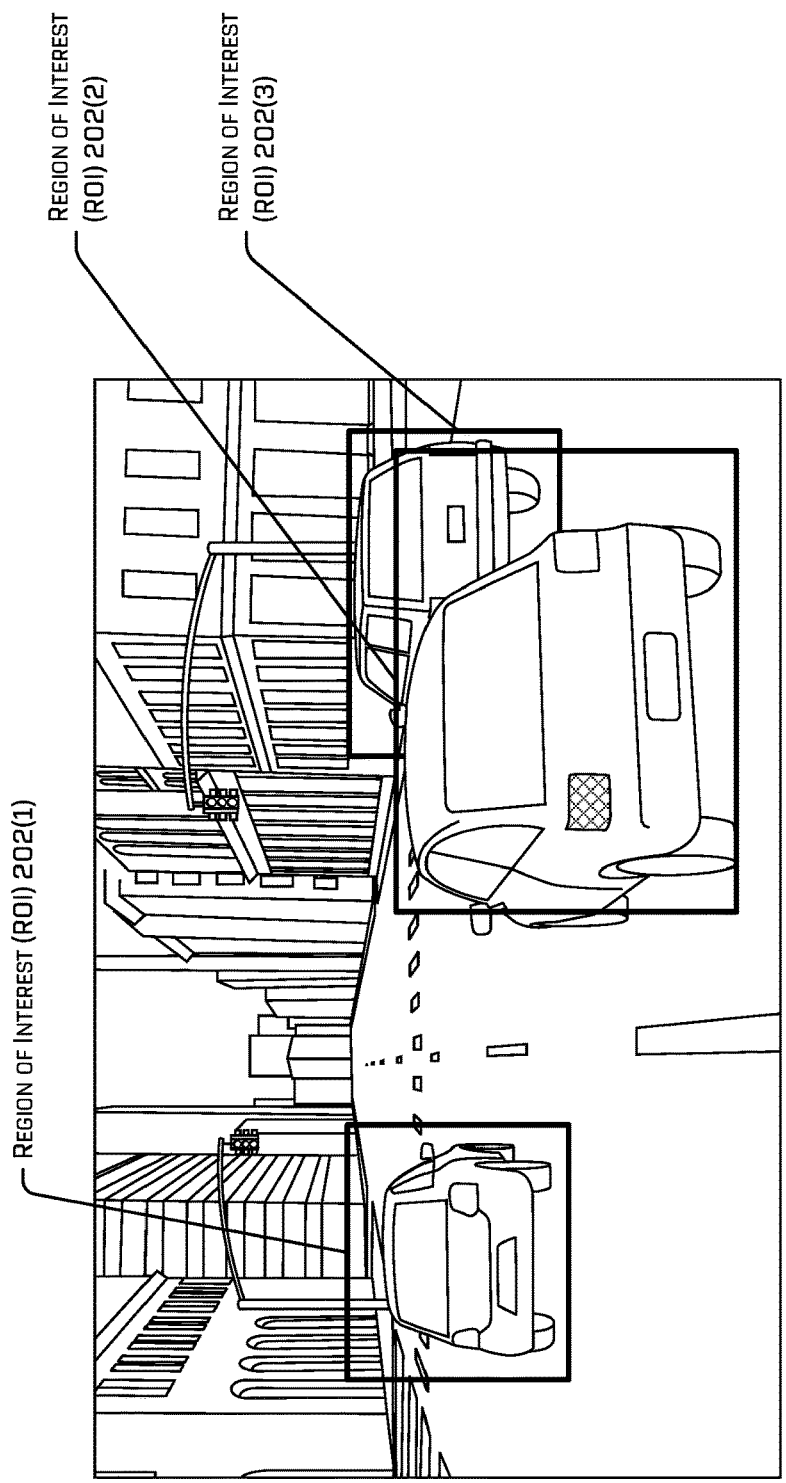
FIG. 2 illustrates an example display that may be output to an operator of an autonomous vehicle in which another vehicle swerved toward vehicle without the autonomous operation system of the vehicle perceiving or predicting the change.

FIG. 2 illustrates an example image 200 illustrating an example display of a scenario in which another vehicle swerved toward vehicle 102 without the autonomous operation components of the vehicle 102 perceiving or predicting the change. Specifically, the perception component 130 has perceived all three other vehicles and identified each with a ROI 202(1)-202(3). The closest vehicle, identified by ROI 202(2), has signaled a lane change and has begun swerving into the left lane. However, ROI 202(2) is not tracking the movement of the closest vehicle due to the failure of the autonomous vehicle system to perceive or predict the movement.

Returning to the operation of the object disengagement attribution component 154, the simulation of the continued operations of the vehicle 102 without reaction to the swerve of the other vehicle in the ground truth data would result in a negative outcome (e.g. a simulated traffic accident, braking above a threshold, steering above a threshold, time to collision below a threshold, etc.). Based on the simulation ending in a negative outcome, the object determination component 152 may identify the other vehicle as the object that caused the disengagement.

Additionally or alternatively, the object or cause of the disengagement may be identified by user input from an operator of the component verification system 148 through, for example, the user interface component 158. It should be noted that, in some examples, the operations of the ground truth component 150 and the object determination component 152 may be performed in reverse order. In a particular example, an operator of the component verification system 148 may provide the identification of the object or cause of the disengagement to the object determination component 152 via the user interface component 158 prior to the determination of the ground truth data. In some such examples, the determination of ground truth data for vehicles and objects in the environment by the ground truth component 150 may be limited to the identified object or the identified object and other vehicles and objects in close proximity to the identified object.

In the case that the object determination component 152 does not identify an object or cause of the event (e.g., disengagement), the object determination component 152 may determine the event was unnecessary (e.g. the result of an excessive caution or misunderstanding of the operator). In such a case, the object determination component 152 may log the unnecessary disengagement and discontinue the component verification operations for the disengagement. In other examples, however, the system may flag the scenario for further inspection as the cause of the event may be indeterminate.

In cases where an object or cause is identified, the disengagement attribution component 154 may operate to determine which, if any, components of the autonomous operation system caused the disengagement (or which component provided information, that, if more accurate, would have prevented the disengagement) or should be improved to avoid or reduce the occurrence of future disengagements. The determination by the disengagement attribution component 154 may include various determinations which may occur in different orders or in parallel in various implementations. Further, some examples may not perform all of the example determinations discussed below.

In some examples, the disengagement attribution component 154 may determine whether a practical actor (e.g. a reasonably skilled and capable human) could have avoided the scenario resulting in the disengagement based on the ground truth data. Additionally, or alternatively, kinematics and/or response times of the system may be used in making such a determination. In such examples, maximum accelerations/decelerations and steering rates may be used in conjunction with average system latency times and environmental data (object positions and velocities) to determine whether the event was unavoidable. In some examples, the determination that the scenario was unavoidable may indicate that the disengagement can be attributed to actions and events which were beyond the control of the autonomous operation system of the vehicle 102.

In some examples, the determination of whether a practical actor could have avoided the scenario may be performed using a machine learned model or through another automated process, for example, operating on the ground truth data. For example, a machine learned model may be trained using reaction scenarios from human operators and presented with the ground truth data as input to determine whether a practical actor could have avoided the scenario. In another example, the disengagement attribution component may be programmed with practical reaction parameters and may utilize those parameters to determine whether the situation could have been avoided.

In other examples, the determination of whether a practical actor could have avoided the scenario may be performed by an operator of the component verification system 148. For example, the disengagement attribution component 154 may output a rendering of the scenario based on the ground truth data through the user interface component 158. The form of the rendering may vary. In some examples, the rendering may comprise a three dimensional-box world view of the environment with velocities and trajectory information but without camera data. Based on the rendering, the operator of the component verification system 148 may input whether a practical actor (e.g. a reasonably skilled and capable human) could have avoided the scenario resulting in the disengagement. In another example, the human operator may be presented with the scenario in a simulation (e.g. on a regular computer, a virtual reality system, etc.) to see if the operator is able to overcome the scenario.

In some examples, an unavoidable event may be an event caused by another object in the environment (e.g. a blowout of a tire of another vehicle, the swerving of another vehicle into the autonomous vehicle from a very close proximity) or an object in a sensor blind spot or in a location obstructed by another object in the environment (e.g. a vehicle hitting other vehicle beside the autonomous vehicle in such a way that the sensors of the autonomous vehicle could not perceive the imminent collision).

In some instances, where the scenario resulting in the disengagement is determined to be unavoidable, the disengagement attribution component 154 may log the disengagement as an unavoidable scenario and discontinue component verification processing for the current disengagement event. By discontinuing component verification, processing resources may be reserved for other tasks since, if the scenario is unavoidable, it may be impossible to determine an error in a component of subcomponent based on the scenario data.

The disengagement attribution component 154 may determine the component of the autonomous operation system that caused the disengagement event or which may be improved to avoid or reduce the occurrence of future disengagements. As mentioned above, this determination may be triggered by a determination that the scenario was not unavoidable but may be performed without regard to the determination of whether the scenario was unavoidable. In an example in which the disengagement attribution component 154 is configured to determine whether the perception component 130 or prediction component 134 should be improved to reduce the occurrence of future disengagement events, the disengagement attribution component 154 may repeat the prediction processing performed by the prediction component 134 of the autonomous operation system using the ground truth data in place of the perception data (or a portion thereof) to generate ground truth-based prediction output data. The disengagement attribution component 154 may simulate further processing by the autonomous operation system (e.g. a planning component thereof) based on the ground truth-based prediction output data. The disengagement attribution component 154 may determine whether the autonomous operation system 4 correctly handled the scenario associated with the disengagement when provided with the ground truth-based prediction output data. If so, the disengagement attribution component 154 may determine that the perception component 130 of the autonomous operation system may be improved to reduce the occurrence of future disengagement events. In other words, because the simulated operations based on the ground truth-based prediction output data resulted in the correct handling of the scenario, the disengagement attribution component 154 may determine the disengagement may be attributed to the deviation in the perception data generated by the perception component 130 from ground truth. If the autonomous operation system failed to correctly handle the scenario associated with the disengagement when provided with the ground truth-based prediction output data, the disengagement attribution component 154 may determine that the prediction component 134 of the autonomous operation system may be improved to reduce the occurrence of future events. In other words, because the ground truth-based prediction output data generated based on ground truth data still resulted in incorrect handling of the situation by the autonomous operation system, the disengagement may be attributed to the generation of prediction data by the prediction component 134.

The analysis component 156 may perform an analysis to determine one or more aspects of the identified component of the autonomous operation system component which may be improved to accomplish the reduction in the occurrence of future events.

Returning to the example of a disengagement attributed to the perception component 130, the analysis component 156 may determine one or more perception component 130 outputs whose generation by the perception component 130 may be improved to accomplish the reduction in the occurrence of future events.

Figure 5:
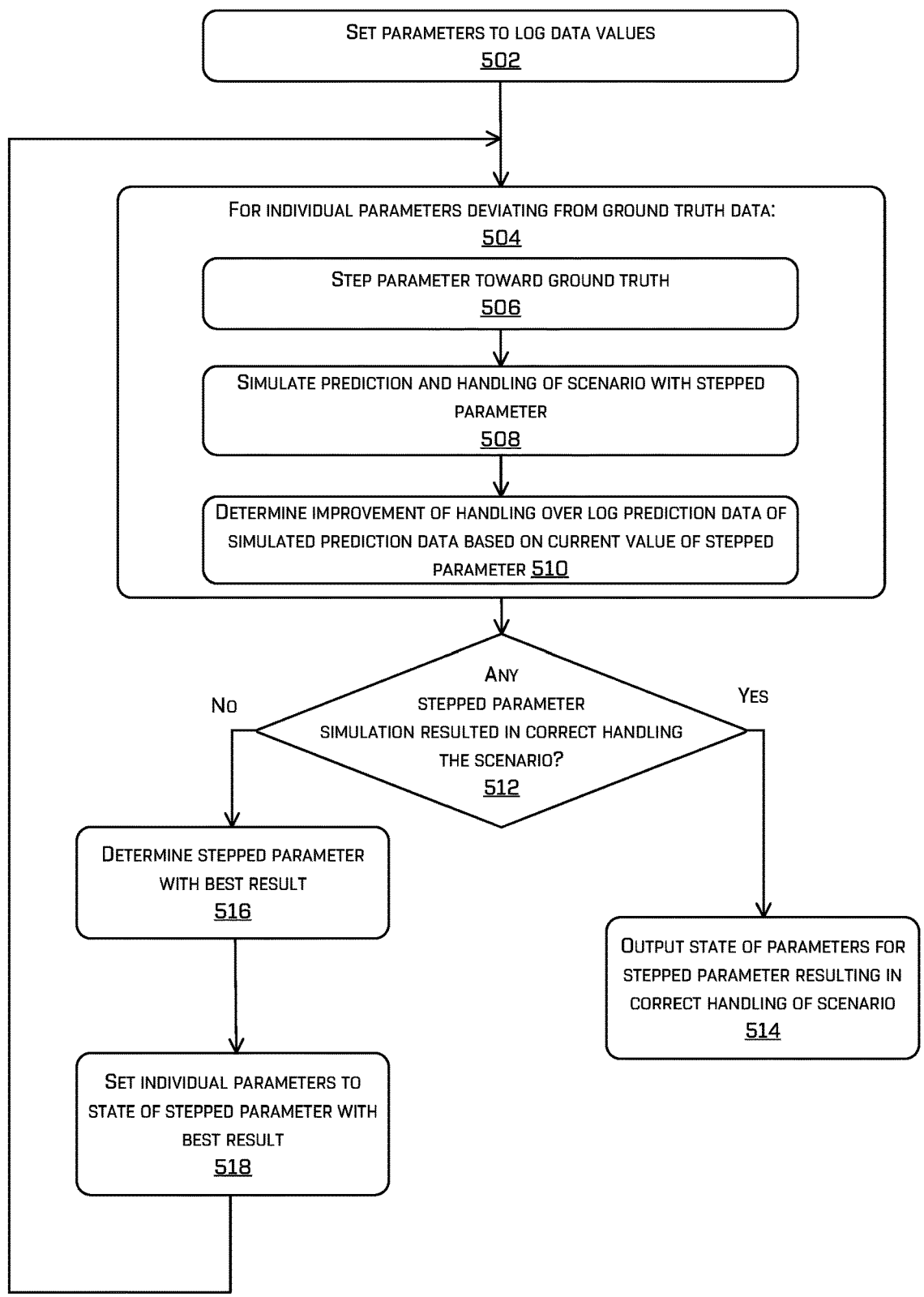
FIG. 5 illustrates a flow diagram of an example process for analyzing a disengagement event to determine which aspects of a perception component may be improved to reduce the occurrence of similar disengagement events in the future.
Figure 6:
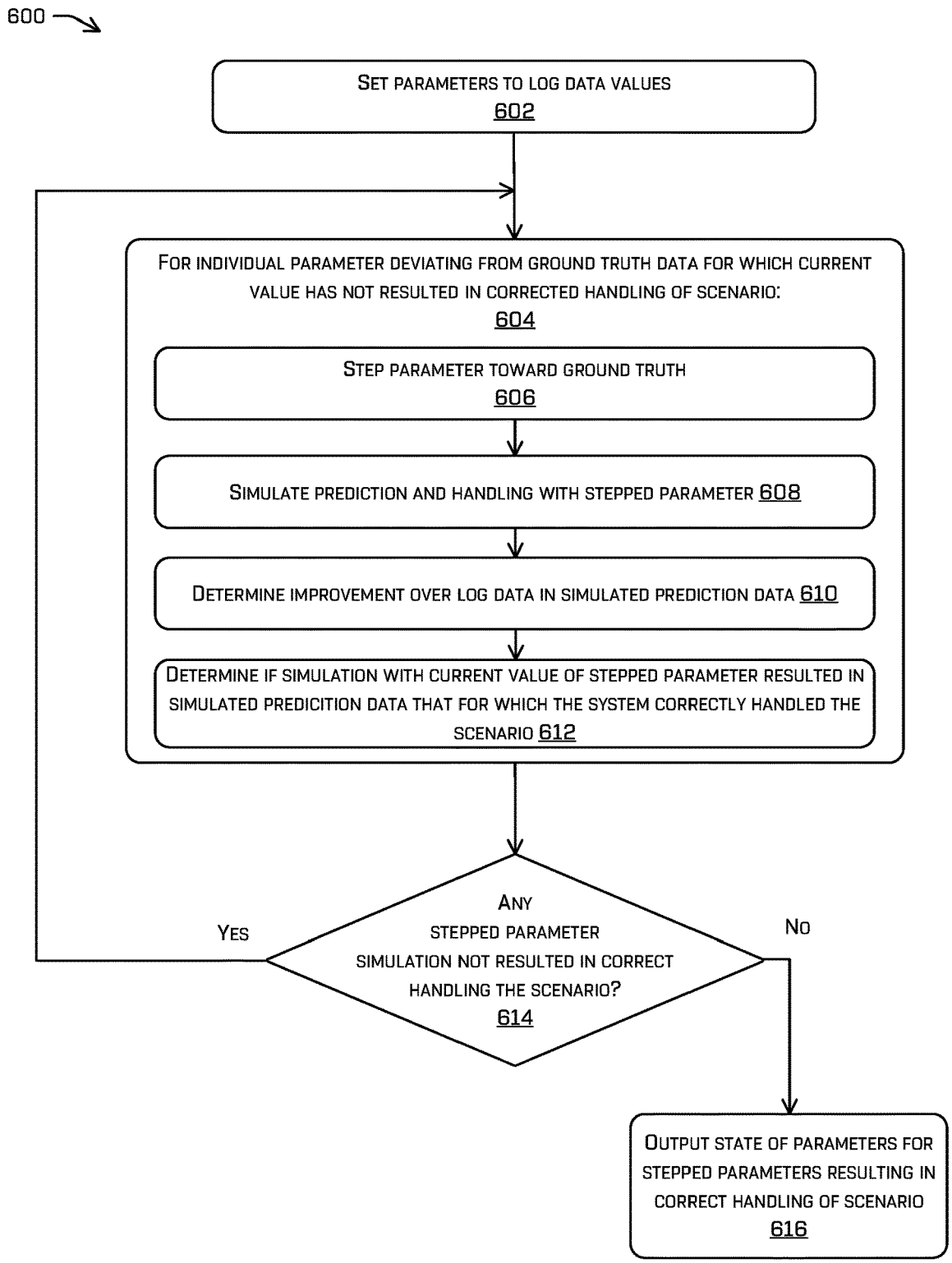
FIG. 6 illustrates a flow diagram of an example process for analyzing a disengagement event to determine which aspects of a perception component may be improved to reduce the occurrence of similar disengagement events in the future.

The prediction component 134 may receive, as input to a machine learned model, a number of features about the object. This may define a decision surface of the inputs that partitions the input space in such a way that allows the classifier to determine the predicted trajectory of the object. Based on this, the analysis component 156 may utilize the ground truth data associated with the object as an "upper bound" on the inputs to the prediction component 134 and the logged output from the perception component as a "lower bound" on the inputs to the prediction component 134. The analysis component 156 may perform simulations of the prediction logic while sweeping the range of the inputs between the upper and lower bounds to identify improvements to the perception component 130 outputs that would generate a correct prediction for the disengagement. Two example processes for performing such a sweep of the inputs to the prediction component 134 are shown in FIGS. 5 and 6.

In the case of the disengagement being attributed to the prediction component 134, the analysis component 156 may be configured to cause additional training of a machine learned model of the prediction component to be performed using the current disengagement and, optionally, other similar disengagements. Additionally or alternatively, the analysis component 156 may be configured to flag the prediction component 134 to an operator of the component verification system 148 for improvement, for example, based on additional training using the current disengagement and, optionally, other similar disengagements.

Once the component to which the failure was attributed has been improved or further trained, the component analysis may be repeated and/or the improved or retrained component may be output to one or more autonomous operations systems for further operations.

Accordingly, the techniques discussed herein provide a robust implementation for determining the cause of trigger events, such as disengagement events, based on log data which may allow for directed improvements to components of the autonomous operation system of the vehicle.

While the example system to FIG. 1 operates based on image data captured by autonomous vehicles, implementations are not so limited and the source of the image data may vary. Other variations or features may be incorporated into some implementations.

Example Processes

Figure 3:
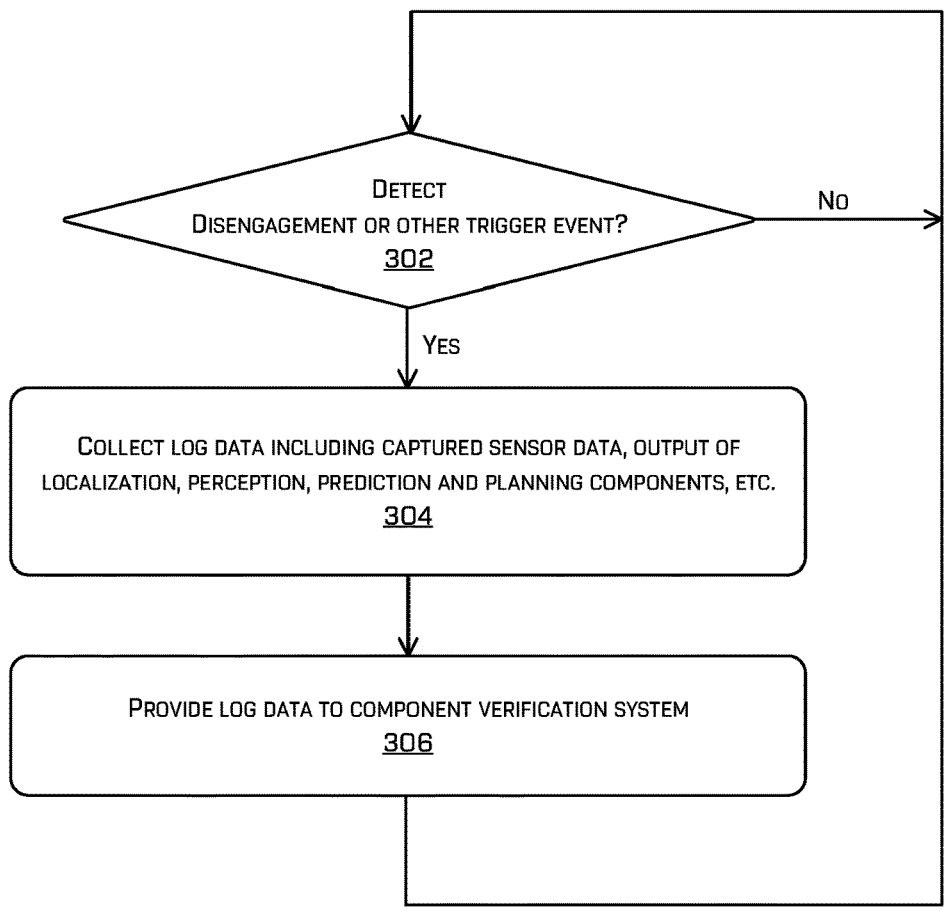
FIG. 3 illustrates a flow diagram of an example process for detecting trigger events, such as disengagement events, and providing log data regarding the trigger events to a component verification system.

FIG. 3 illustrates an example process 300 for detecting trigger events such as disengagement events and providing log data regarding the trigger events to a component verification system. In some examples, process 300 may be accomplished by component(s) of system 100. In some examples, the example process 300 may be performed by an onboard computer system of an autonomous vehicle 102 or may be performed in whole or in part by aspects of the computing device(s) 110. While FIG. 3 is discussed in the specific context of disengagement events, some implementations may perform similar operations with regard to any type of similar event in the operation of the autonomous operation system of the vehicle.

At operation 302, the system controller (or other portion) of the computing devices onboard the autonomous vehicle (or any vehicle) may detect disengagement of the autonomous operation mode of the autonomous vehicle or other trigger event. If so, the process may continue to 304. Otherwise, the process may return to 302 and continue monitoring for events.

At operation 304, the computing devices of the autonomous vehicle may collect log data including captured sensor data, the output of localization, perception, prediction and planning components, and so on regarding the disengagement event (e.g. log data may be raw sensor data, perception output, prediction output, planner output, and control messages). The onboard computing devices may then provide the collected log data to the component verification system at 306.

Note that, although the example is described as occurring on an autonomous vehicle, implementations are not so limited. For example, in some implementations, the detection and flagging of objects for map update may be performed by a semi-autonomous vehicle with an onboard sensor and computing device system that performs the operations discussed above.

Figure 4:
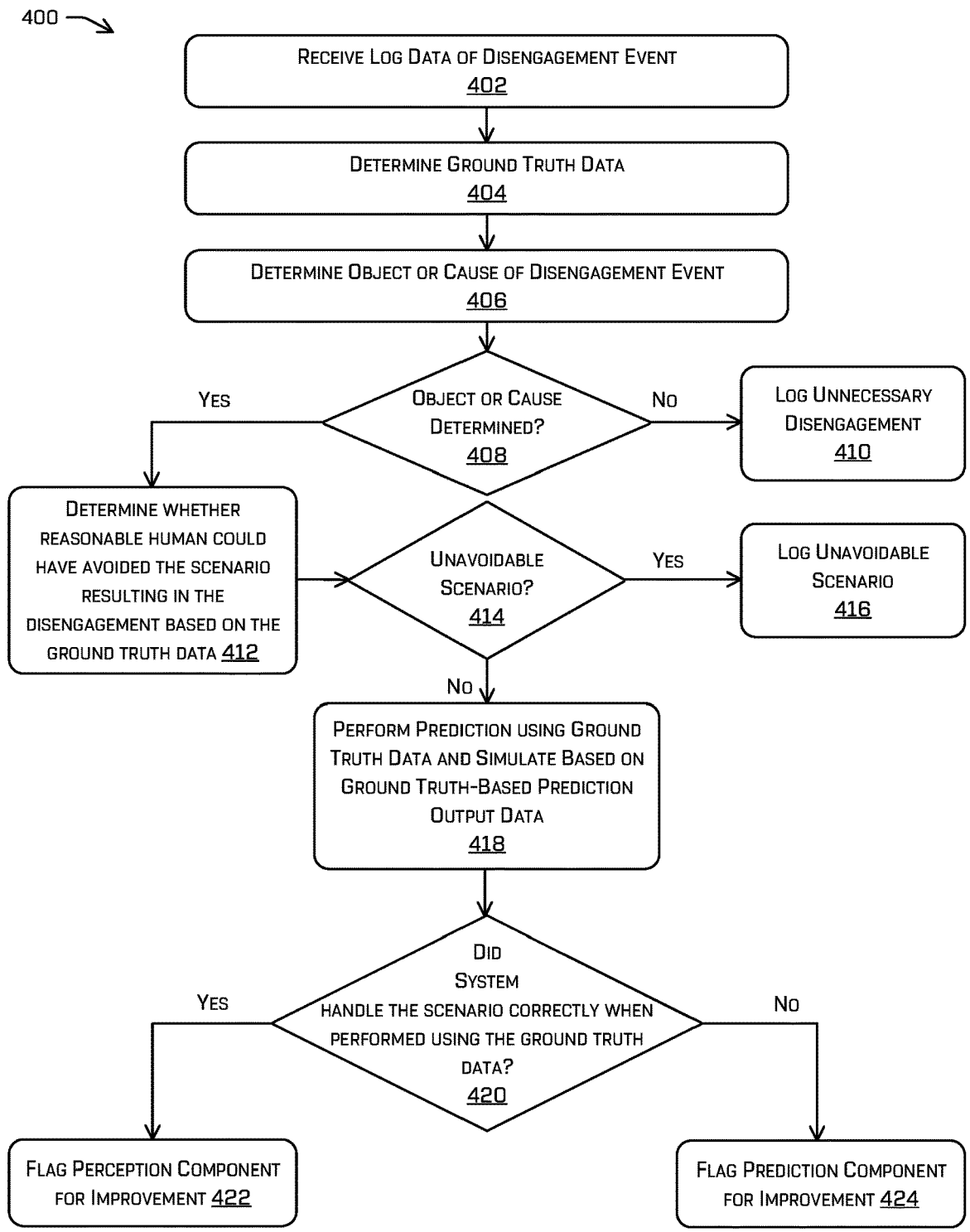
FIG. 4 illustrates a flow diagram of an example process for analyzing disengagement events in autonomous vehicles to determine an autonomous operation system component to which the disengagement can be attributed.

FIG. 4 illustrates an example process 400 for analyzing disengagement events in autonomous vehicles to determine an autonomous operation system component to which the disengagement can be attributed. In some examples, example process 400 may be accomplished by component(s) of system 100. In some examples, the process 400 may be performed by a component verification system 148 of an autonomous vehicle system 100. While FIG. 4 is discussed in the specific context of disengagement events, some implementations may perform similar operations with regard to any type of objects in the environment which is represented in the map data.

At operation 402, the component verification system may receive data associated with an autonomous vehicle including log data of a disengagement event. However, as mentioned above, implementations are not limited to inputs received from an autonomous vehicle. In other implementations, the log data may be from another source of operational data.

At 404, the component verification system may determine ground truth data for the disengagement event. The component verification system may then determine the object or cause of the disengagement event at 406. For example, the component verification system determine the cause of the disengagement event as discussed above with regard to the object determination component 152. At 408, the component verification system may determine whether an object or cause was determined. If not, the process may continue to 410, where the component verification system may log the unnecessary disengagement and discontinue the analysis of the current disengagement event. Otherwise, the process may continue to 412.

At 412, the component verification system may determine whether a reasonable human could have avoided the scenario resulting in the disengagement based on the ground truth data, such as described in detail above. The component verification system may then determine if the disengagement event was determined to be unavoidable at 414. If so, the process may continue to 416, where the component verification system may log the unavoidable scenario and discontinue the analysis of the current disengagement event. Otherwise, the process may continue to 418.

At 418, the component verification system may perform prediction based on the ground truth data. For example, the ground truth data may be input to a machine learned model of the prediction component 134 of the vehicle 102 to generate ground truth-based prediction output data. The component verification system may then simulate operations of the automated operations system based on the ground truth-based prediction output data and determine whether the automated operation system would have handled the scenario associated with the disengagement event correctly when given the ground truth-based prediction output data at 420. For example, if the cause of the disengagement event determined at 406 was avoided or not replicated when the planning was performed using the ground truth-based prediction output data, the component verification system may determine the scenario was handled correctly. If the component verification system determines the scenario was handled correctly, the process may continue to 422, where the component verification system may flag the perception component for analysis and improvement. Otherwise, the process may continue to 424, where the component verification system may flag the prediction component for improvement.

Note that, although the example process 400 is depicted as sequential operations, it is understood that the operations discussed herein may be performed in a different order, simultaneously, and/or by one or more devices.

FIGS. 5 and 6 illustrate example processes that may be used to analyze a disengagement event attributed to a perception component to determine which aspects of the perception component may be improved to reduce the occurrence of similar disengagement events in the future.

FIG. 5 illustrates an example process 500 for analyzing a disengagement event to determine which aspects of the perception component may be improved to reduce the occurrence of similar disengagement events in the future. In some examples, example process 500 may be accomplished by component(s) of system 100. In some examples, the process 500 may be performed by an analysis component 156 of the component verification system 148 of an autonomous vehicle system 100. While FIG. 5 is discussed in the specific context of disengagement events, some implementations may perform similar operations with regard to any type of event.

At operation 502, the analysis component may set the current values of parameters to be input to a logic of a prediction component (e.g. a machine learned model of the prediction component 134) to the parameters of the log data associated with a disengagement event in an autonomous vehicle. Such parameters may comprise, but are not limited to, object sizes, locations, velocities, classifications, raw sensor data, environmental parameters (time of day, geolocation, lane position, map data, weather data, etc.), hyperparameters of a machine learned model, and the like. However, as mentioned above, implementations are not limited to inputs received from an autonomous vehicle.

At 504, the analysis component may perform a simulated prediction and handling for individual parameters that deviate from the ground truth data. In particular, at suboperation 506, the analysis component may step the respective parameter toward the ground truth value of the respective parameter by one step. The size or manner of the stepping of parameters from the log data value to the ground truth value may vary from implementation to implementation. For example, the step size for a parameter may be set based on the expected magnitude and expected degree of uncertainty of the parameter in the operation of the system. At suboperation 508, the analysis component may simulate prediction by the prediction component for the scenario associated with the disengagement based on the stepped parameter and the current state of the other parameters to generate simulated prediction data. The analysis component may then simulate the further operations of the automated operations system (e.g. planning by the planning component) to determine the handling of the scenario based on the simulated prediction data. At suboperation 510, the analysis component may determine the improvement of the simulated handling based on the simulated prediction data over the log data prediction.

At 512, the analysis component may determine whether any simulated handling for a stepped parameter at 504 resulted in the correct handling of the scenario associated with the disengagement event. If so, the process may continue to 514. Otherwise, the process may continue to 516.

At 514, the analysis component may output the state of the parameters used in the correct prediction and simulated handling and discontinue the analysis of the current disengagement event. In addition, the analysis component may also indicate the deviation of the output parameters for the correct prediction and simulated handling from those in the log data or from the ground truth data. This may represent the amount of improvement in the determination of the changed parameters by the perception component toward the ground truth value needed to avoid the current disengagement event and to reduce the occurrence of similar disengagement events in the future. The deviation from the ground truth data may also be indicative of the degree of uncertainty in the parameter output by the perception component which does not disrupt the predication component and the autonomous system as a whole.

At 516, the analysis component may determine the stepped parameter whose respective simulation resulted in the best result (e.g. came closest to avoiding the cause of the disengagement event). Various metrics may be utilized to make this determination. In some cases, the analysis component may determine an L2 distance to measure the difference between predicted trajectory and a ground truth trajectory of the object (e.g. which may be obtained by looking at the future ground truth or logged position of the object in the log). The analysis component may then utilize backpropagation (that, in some examples, comprises keeping the weights of the neural network fixed) with the difference as a loss function to determine which outputs to vary.

The analysis component may then set the value of the current parameters to those of the stepped parameter whose respective simulation resulted in the best result. The process may then return to 504 for additional simulation.

FIG. 6 illustrates an example process 600 for analyzing a disengagement event to determine which aspects of the perception component may be improved to reduce the occurrence of similar disengagement events in the future. In some examples, example process 600 may be accomplished by component(s) of system 100. In some examples, the process 600 may be performed by an analysis component 156 of the component verification system 148 of an autonomous vehicle system 100. While FIG. 6 is discussed in the specific context of disengagement events, some implementations may perform similar operations with regard to any type of event.

At operation 602, the analysis component may set the current values of parameters to be input to a logic of a prediction component (e.g. a machine learned model of the prediction component 134) to the parameters of the log data associated with a disengagement event in an autonomous vehicle (e.g., raw sensor data and/or data output from a perception component as described herein). However, as mentioned above, implementations are not limited to inputs received from an autonomous vehicle.

At 604, the analysis component may perform a simulated prediction and handling for individual parameter for which the current value deviates from the ground truth data and has not resulted in the prediction component correctly handling the scenario associated with the disengagement event. In particular, at suboperation 606, the analysis component may step the respective parameter toward the ground truth value of the respective parameter by one step. At suboperation 608, the analysis component may simulate prediction by the prediction component for the scenario associated with the disengagement based on the stepped parameter and the log data state of the other parameters to generate simulated prediction data. The analysis component may then simulate the further operations of the automated operations system (e.g. planning by the planning component) to determine the handling of the scenario based on the simulated prediction data. At suboperation 610, the analysis component may determine the improvement of the simulated prediction and handling based on the current value of the stepped parameter over the log prediction data. At suboperation 612, the analysis component may determine whether the simulated prediction and handling based on the current value of the stepped parameter resulted in the correct handling of the scenario.

At 614, the analysis component may determine whether any simulated prediction and handling for a stepped parameter at 604 has not resulted in the correct handling of the scenario associated with the disengagement event. If there remains a stepped parameter that has not resulted in the correct handling of the disengagement event and which still deviates from the ground truth data, the process may return to 604 for additional simulation. Otherwise, the process may continue to 616.

At 616, the analysis component may output the state of the parameters for stepped parameters that resulted in correct predictions and handling and then discontinue the analysis of the current disengagement event. In addition, the analysis component may also indicate the deviation of the output parameters for the correct prediction from those in the log data. This may represent the amount of improvement in the determination of the changed parameters by the perception component toward the ground truth value needed to avoid the current disengagement event and to reduce the occurrence of similar disengagement events in the future.

Note that, although the example processes 500 and 600 are depicted as sequential operations, it is understood that the operations discussed herein may be performed in a different order, simultaneously, and/or by one or more devices. Further, though processes 500 and 600 is described as receiving log data from an autonomous vehicle or as being part of an autonomous vehicle control system, implementations are not so limited.

Moreover, while process 600 is illustrated as handling parameters singly, implementations are not so limited. For example, process 600 may also operate based on combinations of parameters which may be stepped together, in an alternating manner or in other patterns. Further, while process 600 is illustrated as handling the stepping of parameters in parallel, other implementations may handle parameters serially and may discontinue analysis when a stepping of a parameter results in correct handling by the prediction component. In some such examples, the order in which parameters are handled by the analysis component may be chosen based on a categorization of the disengagement event or the object associated therewith (e.g. an order for disengagements associated with other vehicles, an order for disengagements associated with pedestrians and an order associated with traffic signals, etc.).

Example Clauses

A. A method comprising receiving log data associated with an event while operating an autonomous vehicle, the log data comprising perception data associated with a perception system of an autonomous vehicle and prediction data associated with a prediction system of the autonomous vehicle; determining, based at least in part on the log data, ground truth data associated with the event and comprising ground truth perception data and ground truth prediction data; simulating, based on the ground truth-based perception output data, operation of the autonomous vehicle; determining whether the event occurs in the simulation; and determining, based at least in part on whether the event occurs in the simulation, that the event is associated with one or more of the perception system or the prediction system.

B. The method of example A, further comprising: determining the event is associated with the prediction system at least partly in response to determining the event occurs in the simulation; training a machine learned model associated with the prediction system using log data associated with a plurality of events; generating, using the trained machine learned model, additional prediction output data based at least in part on the ground truth data; simulating, based on the additional prediction output data, further operation of the autonomous operation system based on the additional prediction output data; and determining whether the event occurs in the further simulated operation.

C. The method of example A, further comprising: determining an absence of the event in the simulation; determining the event is associated with the perception system based at least in part on the absence; altering, as altered output, a parameter of an output of the perception system to be closer in value to the ground truth perception data; running a second simulation based at least in part on the altered output; determining an absence of the event in the second simulation; generating, based on the absence, a signal indicative of an error associated with determining the parameter by the perception system.

D. The method of example C, further comprising:
training the perception system using additional data based at least in part on the signal.

E. The method of example C, wherein the parameter comprises one of: a lighting state; a velocity parameter; a yaw parameter; a position parameter; a classification parameter; and an extents parameter.

F. A system comprising: one or more processors; and a memory storing processor-executable instructions that, when executed by the one or more processors, cause the system to perform operations comprising: receiving, from an autonomous vehicle comprising a vehicle perception system and a vehicle prediction system, log data comprising an indication of an object determined by the vehicle perception system and a trajectory of the object determined by the vehicle prediction system; determining, based at least in part on the log data, ground truth data comprising at least a ground truth indication of the object; determining, based at least in part on the ground truth indication of the object, a ground truth trajectory of the object; and determining, based at least in part on the log data, the ground truth data, and the ground truth trajectory, an error associated with one or more of the vehicle perception system or the vehicle prediction system.

G. The system of example F, wherein the log data is associated with an event, the operations further comprising: inputting the ground truth data into a remote prediction system; receiving, from the remote prediction system, a predicted trajectory of the object; generating, based at least in part on the predicted trajectory of the object, a simulation; and determining an absence of the event in the simulation, wherein determining the error comprises determining the error is associated with the vehicle perception system based at least in part on the absence.

H. The system of example F, the operations further comprising: determining a parameter output by the vehicle perception system to the vehicle prediction system at least in part by stepping the parameter from a log data value of the parameter in the log data toward a ground truth value of the parameter in the ground truth data until a corresponding simulation of further operation of the autonomous vehicle based on a stepped parameter-based prediction output does not result in the event.

I. The system of example G, the operations further comprising: training the perception component based at least in part on the ground truth value.

J. The system of example G, wherein the parameter comprises one of: a lighting state; a velocity parameter; a yaw parameter; a position parameter; a classification parameter; and an extents parameter.

K. The system of example G, wherein stepping the parameter comprises determining a step size based at least in part on one or more of an expected magnitude or an expected uncertainty associated with the parameter.

L. The system of example 1, wherein the log data is associated with an event, the operations further comprising: inputting the ground truth data into the prediction system; receiving, from the prediction system, a predicted trajectory; generating, based at least in part on the predicted trajectory of the object, a simulation; determining an occurrence of the event in the simulation, wherein determining the error comprises determining the error is associated with the vehicle prediction system based at least in part on the occurrence.

M. The system of example L, wherein the event comprises one of: a disengagement of autonomous operation of the autonomous vehicle; a hard braking event by the autonomous vehicle; and a time to collision parameter falling below a threshold.

N. The system of example L, the operations further comprising: training a machine learned model associated with the vehicle prediction system using log data associated with a plurality of events; generating, using the trained machine learned model, additional prediction output data based at least in part on the ground truth data; simulating, based on the additional prediction output data, further operation of the autonomous vehicle based on the additional prediction output data; and determining whether the event occurs in the further simulated operation.

O. One or more non-transitory computer-readable media storing processor-executable instructions that, when executed by one or more processors, cause the one or more processors to perform operations comprising: receiving log data from a system comprising at least a first component configured to detect, as detections, objects in an environment and a second component configured to predict trajectories associated with the detections; receiving ground truth data associated with the log data and comprising a ground truth detection of the object; determining, based on the ground truth data, a ground truth predicted trajectory associated with the object; determining a simulated operation of the system based on the ground truth prediction; and determining an error associated with one or more of the first component or the second component based at least in part on a result of the simulated operation.

P. The one or more non-transitory computer-readable media of example O, wherein: the log data is associated with an event; the result of the simulated operation comprises an absence of the event; and determining the error comprises determining the error is associated with the first component.

Q. The one or more non-transitory computer-readable media of example O, the operations further comprising: determining a parameter output by the first system to the second system at least in part by stepping the parameter from a log data value of the parameter in the log data toward a ground truth value of the parameter in the ground truth data until a corresponding simulated operation system based on a stepped parameter-based output of the second system results in an absence of the event; and outputting an indication that the determination of the parameter by the first system should be improved to avoid the event.

R. The one or more non-transitory computer-readable media of example Q, wherein the parameter comprises one of: a lighting state; a velocity parameter; a yaw parameter; a position parameter; a classification parameter; and an extents parameter.

S. The one or more non-transitory computer-readable media of example O, wherein: the log data is associated with an event; the result of the simulated operation comprises an occurrence of the event; and determining the error comprises determining the error is associated with the second component, the operations further comprising: training a machine learned model associated with the first system using log data associated with a plurality of events.

T. The one or more non-transitory computer-readable media of example S, wherein the system is an autonomous operation system of an autonomous vehicle and the event comprises one of: a disengagement of autonomous operation of the autonomous vehicle; a hard braking event by the autonomous vehicle; and a time to collision parameter falling below a threshold.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving log data associated with an event that occurred while operating an autonomous vehicle, the log data comprising perception data associated with a perception system of the autonomous vehicle and prediction data associated with a prediction system of the autonomous vehicle;
   determining, based at least in part on the log data, ground truth data associated with the event that occurred while operating the autonomous vehicle and comprising ground truth perception data;
   simulating, based on the ground truth perception data, operation of the autonomous vehicle to generate a simulation based on the ground truth perception data, wherein the simulating includes utilizing at least part of the ground truth perception data in place of at least part of the perception data associated with the perception system of the autonomous vehicle;
   determining whether the event that occurred while operating the autonomous vehicle also occurs in the simulation based on the ground truth perception data; and
   determining, based at least in part on whether the event that occurred while operating the autonomous vehicle also occurs in the simulation based on the ground truth perception data, that the event is associated with one or more of the perception system of the autonomous vehicle or the prediction system of the autonomous vehicle.

2. The method of claim 1, wherein the determining that the event is associated with one or more of the perception system of the autonomous vehicle or the prediction system of the autonomous vehicle comprises:
  determining the event is associated with the prediction system at least partly in response to determining the event occurs in the simulation; and
  the method further comprising:
    training a machine learned model associated with the prediction system using log data associated with a plurality of events;
    output data based at least in part on the ground truth data;
    simulating, based on the additional prediction output data, further operation of the autonomous vehicle based on the additional prediction output data; and
    determining whether the event occurs in the further simulated operation.

3. The method of claim 1, wherein:
  the determining whether the event that occurred while operating the autonomous vehicle also occurs in the simulation based on the ground truth perception data comprises determining an absence of the event in the simulation;
  the determining that the event is associated with one or more of the perception system of the autonomous vehicle or the prediction system of the autonomous vehicle comprises determining the event is associated with the perception system based at least in part on the absence; and
  the method further comprising:
    altering, as altered output, a parameter of an output of the perception system to be closer in value to the ground truth perception data;
    running a second simulation based at least in part on the altered output;
    determining another absence of the event in the second simulation; and
    generating, based on the other absence, a signal indicative of an error associated with determining the parameter by the perception system.

4. The method of claim 3, further comprising:
  training the perception system using additional data based at least in part on the signal.

5. The method of claim 3, wherein the parameter comprises at least one of:
  a lighting state;
  a velocity parameter;
  a yaw parameter;
  a position parameter;
  a classification parameter; or
  an extents parameter.

6. The method of claim 1, wherein the event comprises at least one of:
  a disengagement of autonomous operation of the autonomous vehicle;
  a hard braking event by the autonomous vehicle; or
  a time to collision parameter falling below a threshold.

7. The method of claim 1, further comprising:
  determining a parameter output by the perception system to the prediction system at least in part by stepping the parameter from a log data value of the parameter in the log data toward a ground truth value of the parameter in the ground truth data until a corresponding simulation of further operation of the autonomous vehicle based on a stepped parameter-based prediction output does not result in the event.

8. A system comprising:
  one or more processors; and
  one or more non-transitory computer-readable media storing processor-executable instructions that, when executed by the one or more processors, cause the system to perform operations comprising:
    receiving log data associated with an event that occurred while operating an autonomous vehicle, the log data comprising perception data associated with a perception system of the autonomous vehicle and prediction data associated with a prediction system of the autonomous vehicle;
    determining, based at least in part on the log data, ground truth data associated with the event that occurred while operating the autonomous vehicle and comprising ground truth perception data;
    simulating, based on the ground truth perception data, operation of the autonomous vehicle to generate a simulation based on the ground truth perception data, wherein the simulating includes utilizing at least part of the ground truth perception data in place of at least part of the perception data associated with the perception system of the autonomous vehicle;
    determining whether the event that occurred while operating the autonomous vehicle also occurs in the simulation based on the ground truth perception data; and
    determining, based at least in part on whether the event that occurred while operating the autonomous vehicle also occurs in the simulation based on the ground truth perception data, that the event is associated with one or more of the perception system of the autonomous vehicle or the prediction system of the autonomous vehicle.

9. The system of claim 8, wherein the determining that the event is associated with one or more of the perception system of the autonomous vehicle or the prediction system of the autonomous vehicle comprises:
  determining the event is associated with the prediction system at least partly in response to determining the event occurs in the simulation; and
  the operations further comprising:
    training a machine learned model associated with the prediction system using log data associated with a plurality of events;
    generating, using the trained machine learned model, additional prediction output data based at least in part on the ground truth data;
    simulating, based on the additional prediction output data, further operation of the autonomous vehicle based on the additional prediction output data; and
    determining whether the event occurs in the further simulated operation.

10. The system of claim 8, wherein:
  the determining whether the event that occurred while operating the autonomous vehicle also occurs in the simulation based on the ground truth perception data comprises determining an absence of the event in the simulation;
  the determining that the event is associated with one or more of the perception system of the autonomous vehicle or the prediction system of the autonomous vehicle comprises determining the event is associated with the perception system based at least in part on the absence; and the operations further comprising:
    altering, as altered output, a parameter of an output of the perception system to be closer in value to the ground truth perception data;
    running a second simulation based at least in part on the altered output;
    determining another absence of the event in the second simulation; and
    generating, based on the other absence, a signal indicative of an error associated with determining the parameter by the perception system.

11. The system of claim 10, the operations further comprising:
    training the perception system using additional data based at least in part on the signal.

12. The system of claim 8, the operations further comprising:
    determining a parameter output by the perception system to the prediction system at least in part by stepping the parameter from a log data value of the parameter in the log data toward a ground truth value of the parameter in the ground truth data until a corresponding simulation of further operation of the autonomous vehicle based on a stepped parameter-based prediction output does not result in the event.

13. The system of claim 12, wherein stepping the parameter comprises determining a step size based at least in part on one or more of an expected magnitude or an expected uncertainty associated with the parameter.

14. The system of claim 8, wherein the event comprises at least one of:
    a disengagement of autonomous operation of the autonomous vehicle;
    a hard braking event by the autonomous vehicle; or
    a time to collision parameter falling below a threshold.

15. One or more non-transitory computer-readable media storing processor-executable instructions that, when executed by one or more processors, cause the one or more processors to perform operations comprising:
    receiving log data associated with an event that occurred while operating an autonomous vehicle, the log data comprising perception data associated with a perception system of the autonomous vehicle and prediction data associated with a prediction system of the autonomous vehicle;
    determining, based at least in part on the log data, ground truth data associated with the event that occurred while operating the autonomous vehicle and comprising ground truth perception data;
    simulating, based on the ground truth perception data, operation of the autonomous vehicle to generate a simulation based on the ground truth perception data, wherein the simulating includes utilizing at least part of the ground truth perception data in place of at least part of the perception data associated with the perception system of the autonomous vehicle;
    determining whether the event that occurred while operating the autonomous vehicle also occurs in the simulation based on the ground truth perception data; and
    determining, based at least in part on whether the event that occurred while operating the autonomous vehicle also occurs in the simulation based on the ground truth perception data, that the event is associated with one or more of the perception system of the autonomous vehicle or the prediction system of the autonomous vehicle.

16. The one or more non-transitory computer-readable media of claim 15, wherein the determining that the event is associated with one or more of the perception system of the autonomous vehicle or the prediction system of the autonomous vehicle comprises:
    determining the event is associated with the prediction system at least partly in response to determining the event occurs in the simulation; and
    the operations further comprising:
        training a machine learned model associated with the prediction system using log data associated with a plurality of events;
        output data based at least in part on the ground truth data;
        simulating, based on the additional prediction output data, further operation of the autonomous vehicle based on the additional prediction output data; and
        determining whether the event occurs in the further simulated operation.

17. The one or more non-transitory computer-readable media of claim 15, wherein:
    the determining whether the event that occurred while operating the autonomous vehicle also occurs in the simulation based on the ground truth perception data comprises determining an absence of the event in the simulation;
    the determining that the event is associated with one or more of the perception system of the autonomous vehicle or the prediction system of the autonomous vehicle comprises determining the event is associated with the perception system based at least in part on the absence; and
    the operations further comprising:
        altering, as altered output, a parameter of an output of the perception system to be closer in value to the ground truth perception data;
        running a second simulation based at least in part on the altered output;
        determining another absence of the event in the second simulation; and
        generating, based on the other absence, a signal indicative of an error associated with determining the parameter by the perception system.

18. The one or more non-transitory computer-readable media of claim 17, the operations further comprising:
    training the perception system using additional data based at least in part on the signal.

19. The one or more non-transitory computer-readable media of claim 15, the operations further comprising:
    determining a parameter output by the perception system to the prediction system at least in part by stepping the parameter from a log data value of the parameter in the log data toward a ground truth value of the parameter in the ground truth data until a corresponding simulation of further operation of the autonomous vehicle based on a stepped parameter-based prediction output does not result in the event.

20. The one or more non-transitory computer-readable media of claim 19, wherein stepping the parameter comprises determining a step size based at least in part on one or more of an expected magnitude or an expected uncertainty associated with the parameter.

* * * * *